(12) United States Patent
Ichinohe

(10) Patent No.: US 8,053,544 B2
(45) Date of Patent: Nov. 8, 2011

(54) SILICONE FOR PREPARING OPHTHALMIC DEVICES

(75) Inventor: Shoji Ichinohe, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 268 days.

(21) Appl. No.: 12/579,114

(22) Filed: Oct. 14, 2009

(65) Prior Publication Data

US 2010/0093963 A1   Apr. 15, 2010

(30) Foreign Application Priority Data

Oct. 15, 2008  (JP) ................. 2008-266301

(51) Int. Cl.
*C08G 77/12* (2006.01)
(52) U.S. Cl. .......................... 528/31; 526/279
(58) Field of Classification Search ............ 528/31; 526/279
See application file for complete search history.

(56) References Cited

U.S. PATENT DOCUMENTS

| 4,259,467 A | 3/1981 | Keogh et al. |
| 4,260,725 A | 4/1981 | Keogh et al. |
| 2002/0016383 A1 * | 2/2002 | Iwata et al. ............... 523/106 |

FOREIGN PATENT DOCUMENTS

| EP | 0885932 A2 | 12/1998 |
| JP | 62-29776 A | 2/1987 |

OTHER PUBLICATIONS

European Search Report dated Jul. 29, 2011, in European Application No. 09172231.4-1214.

* cited by examiner

*Primary Examiner* — Kuo-Liang Peng
(74) *Attorney, Agent, or Firm* — Birch, Stewart, Kolasch & Birch, LLP

(57) ABSTRACT

The present invention is to provide a silicone having (meth) acryl groups on both ends of a molecule and represented by the formula (I):

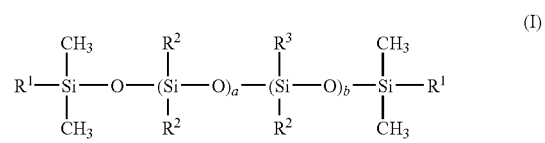

Figure 1:
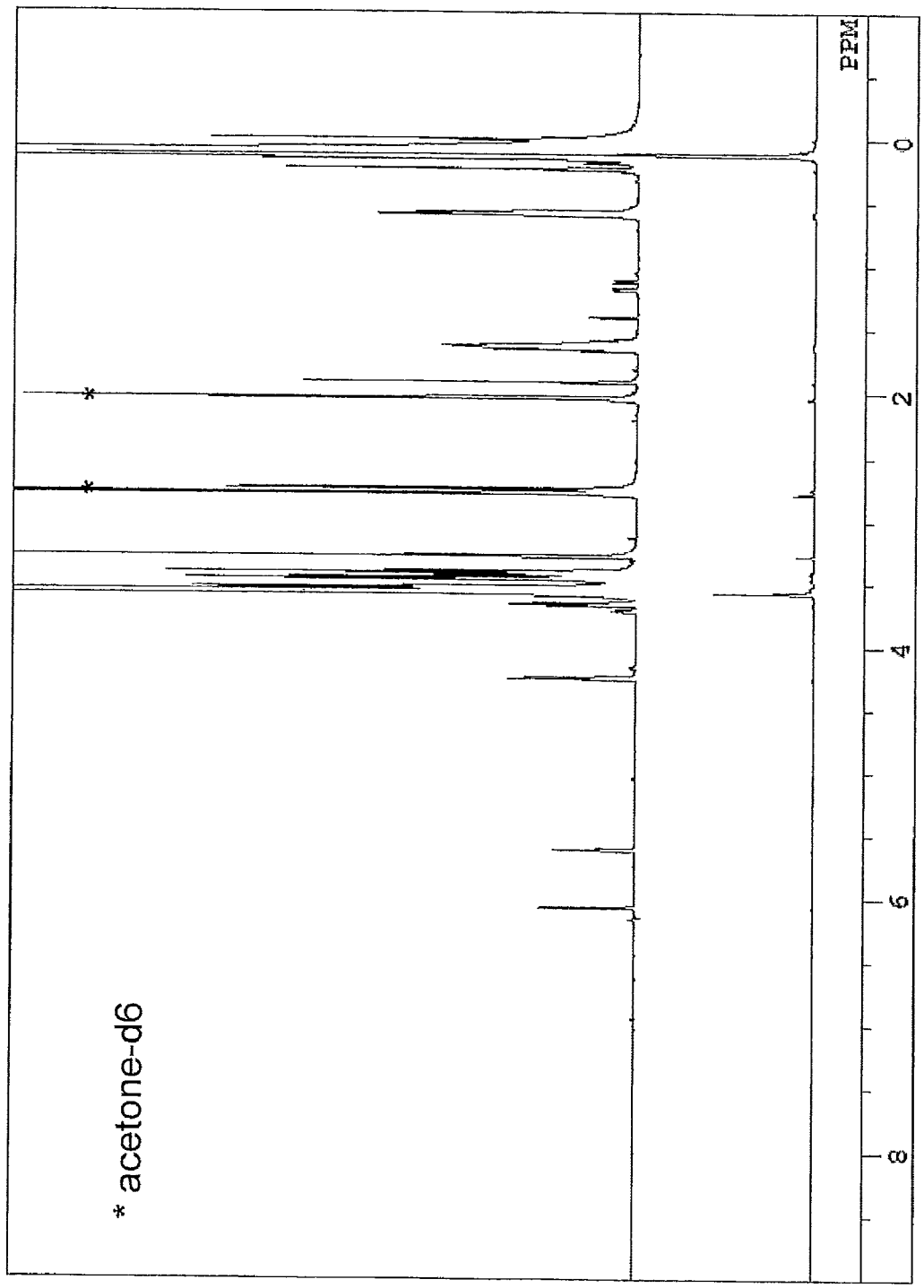

wherein $R^1$ is represented by the following formula:

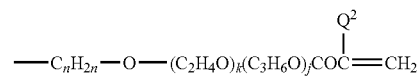

wherein n is 3 or 4, k is an integer of from 1 to 15, j is an integer of from 0 to 15, and $Q^2$ is a methyl group or a hydrogen atom;

$R^2$ is, independently of each other, a group selected from the group consisting of hydrocarbon groups and halogenated hydrocarbon groups, both having 1 to 10 carbon atoms;

$R^3$ is a group represented by the following formula:

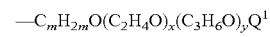

wherein m is 3 or 4, x is an integer of from 1 to 15, y is an integer of from 0 to 15, and $Q^1$ is a methyl group or a hydrogen atom;

a is an integer of from 1 to 500; and b is an integer of from 1 to 100, with a total of a and b being 50 to 500.

5 Claims, 1 Drawing Sheet

SILICONE FOR PREPARING OPHTHALMIC DEVICES

CROSS REFERENCES

This application claims the benefits of Japanese Patent Application No. 2008-266301 filed on Oct. 15, 2008, the contents of which are hereby incorporated by reference.

The present invention relates to a silicone for preparing ophthalmic devices, specifically a silicone which has (meth) acryl groups on both ends. The present silicone is copolymerizable with a monomer used for preparing ophthalmic devices, to form a cross-linked structure, which thereby provides a flexible polymer suitable for ophthalmic devices such as contact lenses such as hydrophilic contact lenses and silicone hydrogel, intraocular lenses, and artificial corneas.

BACKGROUND OF THE INVENTION

A silicone which has polymerizable groups on both ends and a hydrophilic side chain is known from the following Patent Literature 1. It is also known that this silicone is copolymerized with a polymerizable monomer to form hydrophilic contact lenses. The silicone is said to be suitable for medical applications, because it does not have a urethane bond. However, the silicone has a drawback that the conversion of the (meth)acryl groups on the ends of the silicone is not enough and, therefore, the physical properties of the contact lenses obtained vary depending on an amount of the unreacted monomers.

Patent Literature 1: Japanese Patent Publication No. Sho-62-29776/1987

DISCLOSURE OF THE INVENTION

Problems to be Solved by the Invention

The purpose of the present invention is to provide a silicone which gives a higher conversion than the afore-mentioned conventional polysiloxane.

Means to Solve the Problems

The present invention is a silicone having (meth)acryl groups on both ends of a molecule and represented by the following formula (I):

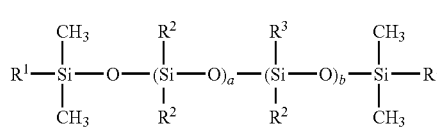

wherein $R^1$ is a group represented by the following formula:

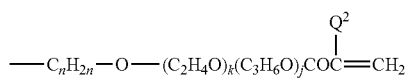

wherein n is 3 or 4, k is an integer of from 1 to 15, j is an integer of from 0 to 15, and $Q^2$ is a methyl group or a hydrogen atom;

$R^2$ is, independently of each other, a group selected from the group consisting of hydrocarbon groups and halogenated hydrocarbon groups, both having 1 to 10 carbon atoms;

$R^3$ is a group represented by the following formula:

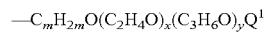

wherein m is 3 or 4, x is an integer of from 1 to 15, y is an integer of from 0 to 15, and $Q^1$ is a methyl group or a hydrogen atom;

a is an integer of from 1 to 500; and b is an integer of from 1 to 100, provided that a total of a and b is from 50 to 500.

Effects of the Invention

In the afore-mentioned conventional silicone, an Si atom on an end of the siloxane is linked with a (meth)acryloxy group via a propylene group or a butylene group (Patent Literature 1, 56th column, where n34 is an integer of from 3 to 4). Meanwhile, the silicone represented by the afore-mentioned formula (I) has an oxyalkylene chain with a particular length, whereby a desired higher reactivity is attained. It is believed, but not limited thereby, that this is because the oxyalkylene group is longer than the propylene group and the butylene group and, therefore, the siloxane moiety is less likely to inhibit the reaction; and the oxyalkylene group is hydrophilic and, therefore, is more compatible with a monomer. The silicone disclosed in a commonly assigned Japanese Patent Application Laid-Open No. 2008-202060 comprises an oxyalkylene group between a (meth)acryl group and an Si atom. However, that silicone is different from the present silicone in that the (meth)acryl group in the former is present only on an end and grafted to a main chain of a polymer.

BRIEF DESCRIPTION ON THE DRAWING

FIG. 1 is $^1$H-NMR spectra of silicone A.

BEST MODES OF THE INVENTION

In the afore-mentioned formula (I), $R^1$ is a group represented by the following formula:

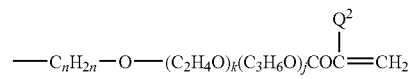

wherein n is 3 or 4, k is an integer of from 1 to 15, preferably from 1 to 5, and j is an integer of from 0 to 15, preferably from 0 to 3. More preferably, k=1 and j=0. $Q^2$ is a methyl group or a hydrogen atom. The present silicone forms a cross-linked structure in a high conversion on account of $R^1$.

$R^2$ is, independently of each other, a group selected from the group consisting of hydrocarbon groups and halogenated hydrocarbon groups, such as a trifluoropropyl group, both having 1 to 10 carbon atoms, preferably a methyl group.

$R^3$ is a group represented by the following formula,

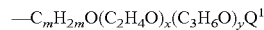

wherein m is an integer of 3 or 4, x is an integer of from 1 to 15, preferably from 4 to 12, and y is an integer of from 0 to 15, preferably from o to 4 with a proviso that x/y≧3. Most preferred is a polyoxyethylene group where x is from 4 to 12 and y=0. $Q^1$ is a methyl group or a hydrogen atom, preferably a methyl group.

In formula (I), a is an integer of from 1 to 500, preferably from 50 to 300, and b is an integer of from to 100, preferably from 4 to 40, provided that a total of a and b is from 50 to 500, preferably from 100 to 300. A ratio, a/b, is preferably 10 to 50, with the proviso that a and b each fall in the afore-mentioned range, for a better balance between its hydrophilicity and hydrophobicity of the siloxane. If the total of a and b is less than the afore-mentioned lower limit, it is difficult to obtain a polymer which has a desired flexibility. Meanwhile, if the total of a and b exceeds the afore-mentioned upper limit, compatibility with a monomer tends to be worse.

The present silicone has a hydrophobic polysiloxane moiety in the backbone and a hydrophilic ether moiety in the side chain. The polysiloxane moiety has an effect of improving oxygen permeability of the copolymer, while the hydrophilic polyether moiety is compatible with a hydrophilic monomer to improve copolymerizability therewith. Further, the (meth) acryl groups on both ends are highly reactive and, therefore, can provide a copolymer with stable physical properties.

The present silicone can homopolymerize to form a polymer suitable for intraocular lenses and is more suitable as a monomer which can copolymerize with another monofunctional monomer to form a cross linked structure. As the monofunctional monomer, mention may be made of those which have a copolymerizable carbon-carbon unsaturated bond, such as a (meth)acryloyl group, a styryl group, an allyl group, and a vinyl group. Examples include (meth)acryl acid, itaconic acid, crotonic acid, cinnamic acid, vinylbenzoic acid, methyl (meth)acrylate, ethyl (meth)acrylate, polyalkylene glylcol mono(meth)acrylate, polyalkylene glylcol monoalkylether (meth)acrylate, trifluoroethyl (meth)acrylate, 2-hydroxyethyl (meth)acrylate, 2,3-dihydroxypropyl (meth)acrylate, N,N-dimethyl acrylamide, N,N-diethyl acrylamide, N-acryloyl morpholine, N-methyl (meth)acrylamide, N-vinyl pyrrolidone, styrene, vinyl pyridine, maleimide; and tris (trimethylsiloxy)silylpropylsilane and bis(trimethylsiloxy) methylsilylpropylsilane monomers which have a polymerizable group such as a (meth)acryl group, a styryl group, and (meth)acryamide group.

The present silicone can be prepared in various methods. In a first method, a silicone having hydroxyl groups on both ends and represented by the following formula (III) is reacted with (meth)acrylic acid chloride in the presence of, for instance, a hydrogen chloride-eliminating agent such as triethyl amine. The silicone having hydroxyl groups on both ends and represented by formula (III) is prepared in an acid-equilibrating method,

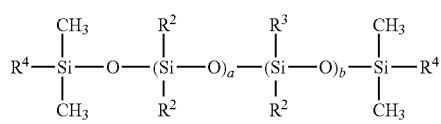

wherein $R^2$, $R^3$, a, and b are as defined above and $R^4$ is a group represented by the following formula:

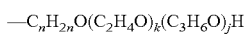

wherein n, k, and j are as defined above.

In a second method, a hydrogen silicone having a (meth) acryl group and represented by the following formula (II) is addition reacted with an excessive amount of (meth)allylpolyether and, then, the unreacted polyether is removed to obtain the silicone represented by formula (I). The hydrogen silicone is prepared in an acid-equilibrating method.

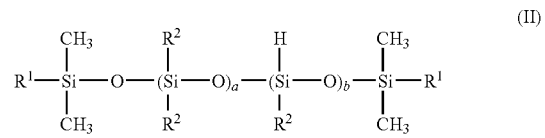

wherein $R^1$, $R^2$, a, and b are as defined above.

In a most preferred route to prepare the one represented by the afore-mentioned formula (II), a (meth)acrylsilicone dimer, which is a source for the terminal groups, is adopted as a starting material. The (meth)acryl silicone dimer is represented by the following general formula:

wherein $R^1$ and $Q^2$ are as defined above.

An example of the starting material is a dimer represented by the following formula (IV).

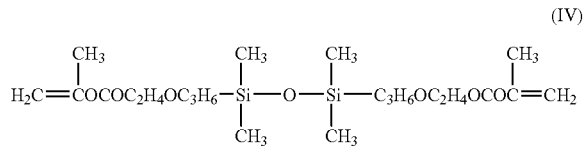

To a reactor are fed the dimer (IV), 1,1,3,3,5,5,7,7-octamethyltetrasiloxane and 1,3,5,7-tetramethyltetrasiloxane in ratios to give a desired structure, and the resulting mixture is acid-equilibrated with the aid of, for instance, trifluoromethanesulfonic acid as a catalyst, neutralized and, then, subjected to stripping for substances with low boiling points under a reduced pressure to obtain the following silicone(II*):

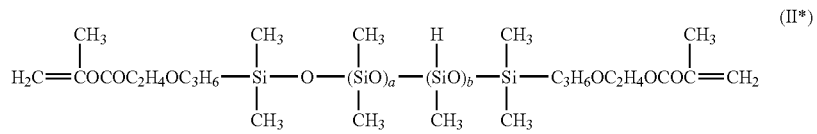

wherein a and b are as defined above.

The silicone represented by formula (II*) is reacted with the following polyether

wherein m, x, y, and $Q^1$ is as defined above, in a ratio of 1 mole of the silicone to (b X 1.2) moles of the polyether in the presence of iso-propyl alcohol as a solvent, chloroplatinic acid-vinyl siloxane complex as a catalyst, and potassium acetate as cocatalyst and, then, an unreacted polyether is removed by extration with methanol to obtain a desired silicone having methacryl groups on both ends,

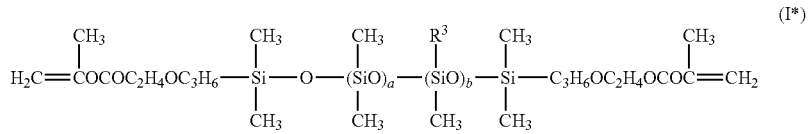

wherein $R^3$, a and b are as defined above.

The afore-mentioned (meth)acryl silicone dimer is prepared in method (1) where a chlorosilane is a starting material or method (2) where a hydroxyl group-containing silicone is a starting material. The flow of each method will be described below.

In method (1), first, hydrosililation with the chlorosilane is performed as shown below.

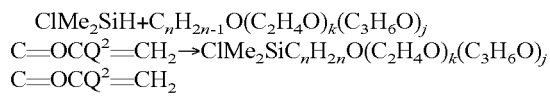

Then, the product is reacted with water for hydrolysis and condensation, as shown below, to obtain the (meth)acryl silicone dimer.

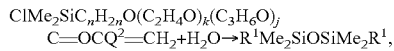

wherein $R^1$ is as defined above.

In method (2), the hydroxyl group-containing silicone esterifies a (meth)acryl group-containing acid chloride to produce the (meth)acryl silicone dimer, as shown below.

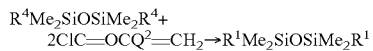

wherein $R^4$ is $C_nH_{2n}O(C_2H_4O)_k(C_3H_6O)_jH$, and $R^1$, n, k and j are as defined above.

EXAMPLES

The present invention will be described more in detail below by reference of the Examples, but shall not be restricted thereto.

Example 1

To a two-litter flask equipped with a Dimroth condenser and a thermometer, were fed 47.4 g (0.1 mole) of a methacrylsilicone dimer (IV),

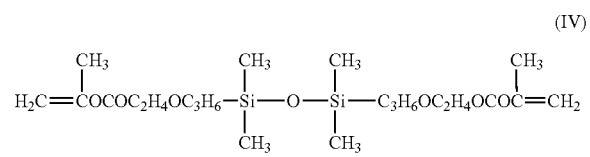

1110 g (3.75 moles) of 1,1,3,3,5,5,7,7-octamethylcyclotetrasiloxane, and 36 g (0.15 mole) of 1,3,5,7-tetramethylcyclotetrasiloxane and, then, 1.8 g of trifluoromethanesulfonic acid (1500 ppm relative to the silicone) and subjected to reaction at room temperature for 8 hours. The mixture after the reaction was neutralized with sodium bicarbonate, filtered, and subjected to stripping at 120 degrees C. and 5 Torr to obtain 1070 g of a coloress, transparent and oily intermediate product in a yield of 90%. The physical properties of the intermediate product were as follows.

Viscosity at 25 degrees C.: 415 mm$^2$/s

Refraction Index at 25 degrees C.: 1.4052

The intermediate product was confirmed by $^{29}$Si-NMR and $^1$H-NMR to have the following structure, wherein the siloxane moiety is indicated in its composition.

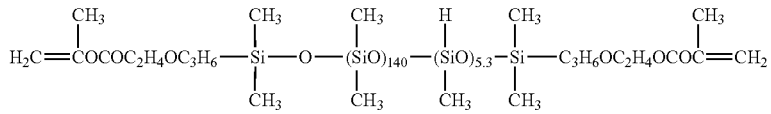

Then, to a one-litter flask equipped with a Dimroth condenser and a thermometer were fed 200 g (0.02 mole) of the intermediate product; 52 g (0.14 mole, corresponding to 1.25 times the mole amount of SiH of the intermediate product) of the allyl polyether which is represented by the following average compositional formula:

$$CH_2=CHCH_2O(C_2H_4O)_{7.4}Me$$

wherein the chain length is on average; 400 g of isopropyl alcohol; 0.13 g of a 2% solution of a chloroplatinic acid-vinyl siloxane complex in butanol; and 0.39 g of a 10% solution of potassium acetate in ethanol and subjected to reaction at 80 degrees C. for hours under reflux of isopropyl alcohol. The amount of unreacted Si—H in the reaction system was below the detection limit, as determined in a conventional method. Isopropyl alcohol was stripped under a reduced pressure to obtain a white, turbid and oily product. The product was put in methanol in an amount of six times the amount of the product, so that the desired product moved into a lower layer. The excessive polyether moved into the upper methanol layer. The lower layer was treated with methanol once again, then, subjected to stripping at 120 degrees C. and 5 Torr and filtered to obtain 146 g of a colorless, transparent and oily product, hereinafter referred to as "silicone A".

The physical properties of silicone A which had methacyl groups on both ends were as follows.

Viscosity at 25 degrees C.: 1223 mm$^2$/s

Refraction index at 25 degrees C.: 1.4150

The following structure of Silicone A was confirmed by $^{29}$Si-NMR and $^1$H-NMR (FIG. 1) to be the following, wherein the siloxane moiety is indicated in its composition.

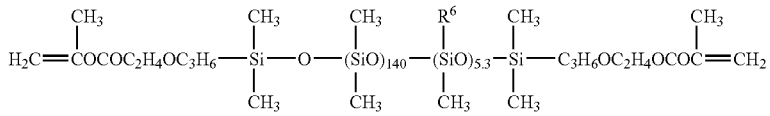

wherein $R^6$ indicates $—C_3H_6O(C_2H_4O)_{7.4}Me$.

Comparative Synthesis Example 1

The procedures in Example 1 were repeated, except that 38.6 grams (0.1 mole) of the following silicone dimer (V) was used instead of 47.4 g (0.1 mole) of methacryl silicone dimer (IV) in Example 1.

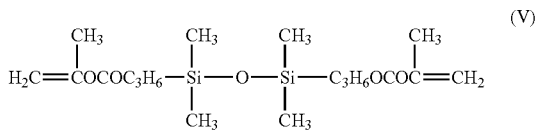

A colorless, transparent and oily product was obtained, hereinafter referred to as "silicone B".

The physical properties of silicone B were as follows.
Viscosity at 25 degrees C.: 1150 mm$^2$/s
Refraction index at 25 degrees C.: 1.4148
The following structure of Silicone B was confirmed by $^{29}$Si-NMR and $^1$H-NMR, wherein the siloxane moiety is indicated in its composition

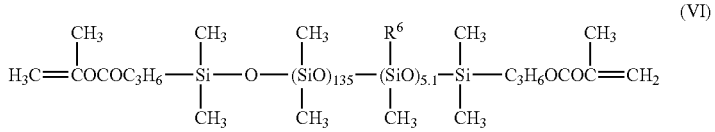

wherein $R^6$ indicates $C_3H_6O(C_2H_4O)_{7.4}Me$.

Example 2

To a reactor were metered 30 parts by mass of silicone A which had been prepared in Example 1, 70 parts by mass of N-vinyl-2-pyrrolidone, 0.1 part by mass of triallylisocyanurate, and 0.1 part by mass of 2,4,6-trimethylbenzoyldiphenylphosphine oxide and mixed with stirring. The resulting mixture was cast into a mold made of an ethylene-vinyl alcohol resin and irradiated with UV for 1 hour in an exposure apparatus to obtain a polymer. The amount of the methacryl group which remained in the polymer was determined by solid $^1$H-NMR. In the NMR, no remaining methacryl group was detected and, therefore, it was found that 100% of the methacryl group in silicone A had reacted.

Comparative Example 1

The procedures in Example 2 were repeated, except that 30 parts by mass of silicone B which was obtained in Comparative Synthesis Example 1 were used instead of silicone A which was used in Example 2. The amount of the methacryl group which remained in the polymer was determined by solid $^1$H-NMR. It was confirmed that 8% of the methacryl group remained, relative to that before the reaction. That is, only 92% of the methacryl group in silicone B reacted.

INDUSTRIAL APPLICABILITY

The (meth)acryl groups on the both ends of the present silicone are highly reactive and, therefore, does not remain in a cured product. Therefore, reproducibility of the physical properties of the polymer obtained is good. Additionally, the present silicone is compatible with monomers which are generally adopted for preparing ophthalmic devices and very useful as a cross-linking agent therefor.

The invention claimed is:

1. A silicone having (meth)acryl groups on both ends of a molecule and represented by the following formula (I):

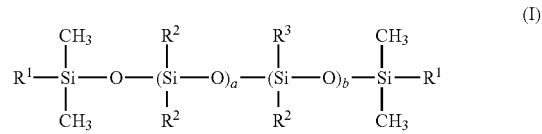

wherein $R^1$ is a group represented by the following formula:

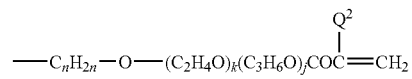

wherein n is 3 or 4, k is an integer of from 1 to 15, j is an integer of from 0 to 15, and $Q^2$ is a methyl group or a hydrogen atom;

$R^2$ is, independently of each other, a group selected from the group consisting of hydrocarbon groups and halogenated hydrocarbon groups, both having 1 to 10 carbon atoms;

$R^3$ is a group represented by the following formula:

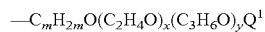

wherein m is 3 or 4, x is an integer of from 1 to 15, y is an integer of from 0 to 15, and $Q^1$ is a methyl group or a hydrogen atom;

a is an integer of from 1 to 500; and b is an integer of from 1 to 100, provided that a total of a and b is from 50 to 500.

2. The silicone according to claim 1, wherein k=1 and j=0 in formula (I).

3. A polymer comprising a residue of the silicone represented by formula (I) as defined in claim 1.

4. A process for preparing the silicone as described in claim 1, comprising a step of addition reacting a hydrogensilicone having (meth)acryl groups on both ends and represented by the following formula (II) with an allyl polyether or methallyl polyether,

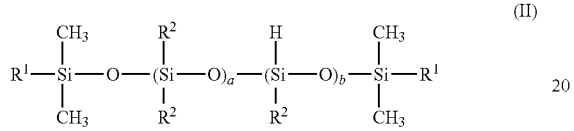
(II)

wherein $R^1$, $R^2$, a and b are as defined in claim 1.

5. The process according to claim 4, wherein the silicone represented by formula (II) is prepared in a process comprising steps:

(1) acid-equilibrating a (meth)acryl silicone dimer represented by the following formula:

with 1,1,3,3,5,5,7,7-octamethylcyclotetrasiloxane and 1,3,5,7-tetramethylcyclotetrasiloxane with the aid of trifluoromethanesulfonic acid as a catalyst;

(2) neutralizing the reaction product obtained in step (1); and (3) stripping a substance with a low boiling point in a reduced pressure.

\* \* \* \* \*